United States Patent [19]

Chonan

[11] Patent Number: 5,427,397

[45] Date of Patent: Jun. 27, 1995

[54] WHEEL SUSPENSION TYPE FRONT FORK

[75] Inventor: Yoshiya Chonan, Toride, Japan

[73] Assignee: SR Suntour Inc., Japan

[21] Appl. No.: 206,350

[22] Filed: Mar. 7, 1994

[30] Foreign Application Priority Data

Mar. 11, 1993 [JP] Japan .................. 5-016632

[51] Int. Cl.⁶ ............................. B62K 25/08
[52] U.S. Cl. ................................ 280/276
[58] Field of Search ............. 280/276, 277, 275, 279, 280/283

[56] References Cited

U.S. PATENT DOCUMENTS

| | | | |
|---|---|---|---|
| 1,432,376 | 10/1922 | Wolff | 280/277 |
| 1,605,680 | 11/1926 | Merkel | 280/276 |
| 2,670,218 | 2/1954 | Rokahr | 280/276 |
| 5,088,705 | 2/1992 | Tsai | 280/276 |

FOREIGN PATENT DOCUMENTS

| | | | |
|---|---|---|---|
| 533569 | 12/1954 | Belgium | 280/277 |
| 1102954 | 10/1955 | France | 280/277 |
| 65155 | 1/1956 | France | 280/276 |
| 1267608 | 6/1961 | France | 280/276 |
| 169383 | 10/1951 | Germany | 280/276 |
| 500810 | 2/1939 | United Kingdom | 280/276 |
| 636282 | 4/1950 | United Kingdom | 280/277 |
| 749047 | 5/1956 | United Kingdom | 280/276 |

Primary Examiner—Margaret A. Focarino
Assistant Examiner—Kevin Hurley
Attorney, Agent, or Firm—Whitham, Curtis, Whitham & McGinn

[57] ABSTRACT

A wheel suspension type front fork can be assembled easily at a low cost. Closely wound portions at both ends of a coil spring 14 are engaged to an upper receiving member 13 fixedly mounted to a lower end of a supporting tube 12 and a lower receiving member 16 fixedly mounted to a lower portion of a sliding tube 15.

5 Claims, 4 Drawing Sheets

WHEEL SUSPENSION TYPE FRONT FORK

BACKGROUND OF THE INVENTION

1. Field of the Invention

The present invention relates to a wheel suspension type front fork of bicycles or other two-wheeled vehicles.

2. Description of the Related Art

Bicycles or the like adopt a wheel suspension type front fork in order to absorb shock when a front wheel encounters a difference in surface level.

It is known that a conventional front fork of this type includes a sliding tube which is slidingly moved vertically with respect to a supporting tube and a coil spring disposed in the sliding tube to absorb the shock. More particularly, the coil spring is disposed between a stopper fixedly mounted to a lower end of the supporting tube and a receiving member disposed in the sliding tube so that both ends of the coil spring abut against the stopper and the receiving member to thereby absorb the shock by moving up and down the sliding tube by expansion and contraction of the coil spring.

However, when both the ends of the coil spring for the shock absorption abut against the stopper and the like as described above, it is necessary to provide a rebound absorption member formed of another coil spring or rubber for absorbing a rebound of the coil spring for the shock absorption separately.

In addition, the conventional front fork of this type includes separately a prevention mechanism for preventing the sliding tube from slipping out from the supporting tube.

Accordingly, the conventional front fork of this type has a complicated structure and is difficult to assemble and expensive since the number of components is increased.

SUMMARY OF THE INVENTION

It is an object of the present invention to provide a wheel suspension type front fork having a simple and inexpensive structure.

According to the present invention, the wheel suspension type front fork comprises an upper receiving member fixedly mounted in a lower end of a supporting tube, a lower receiving member fixedly mounted in a lower portion of a sliding tube and a coil spring disposed in the sliding tube and having both ends which are fixedly mounted to the upper and lower receiving members, respectively.

Since both the ends of the coil spring are fixedly mounted to the upper and lower receiving members, the rebound force of the coil spring is absorbed reactively and since the sliding tube is coupled with the supporting tube through the coil spring, the sliding tube is prevented from slipping out from the supporting tube.

According to the present invention, since both the ends of the coil spring disposed within the sliding tube are fixedly mounted to the upper receiving member disposed at a lower end of the supporting tube and the lower receiving member disposed at a lower portion of the sliding tube, respectively, rebound and slipping out of the sliding tube can be prevented without the provision of any rebound absorbing mechanism and slipping out prevention mechanism of the sliding tube.

Accordingly, there can be provided the wheel suspension type front fork which can be assembled easily at a low cost and is light in weight.

Further, by providing helical grooves in V-shape in section in the upper and lower receiving members, the coil springs having a different diameters of wire can be selected at discretion to obtain a desired absorption force.

DESCRIPTION OF THE PREFERRED EMBODIMENTS

Referring now to the accompanying drawings, an embodiment of the present invention is described in detail.

Figure 1:
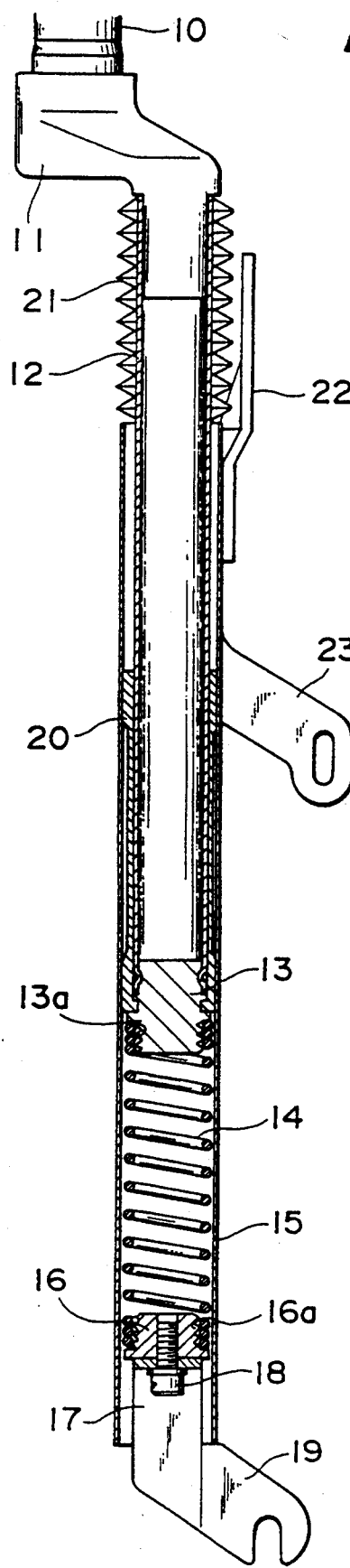
FIG. 1 is a sectional view of a wheel suspension type front fork according to the present invention.
Figure 2:
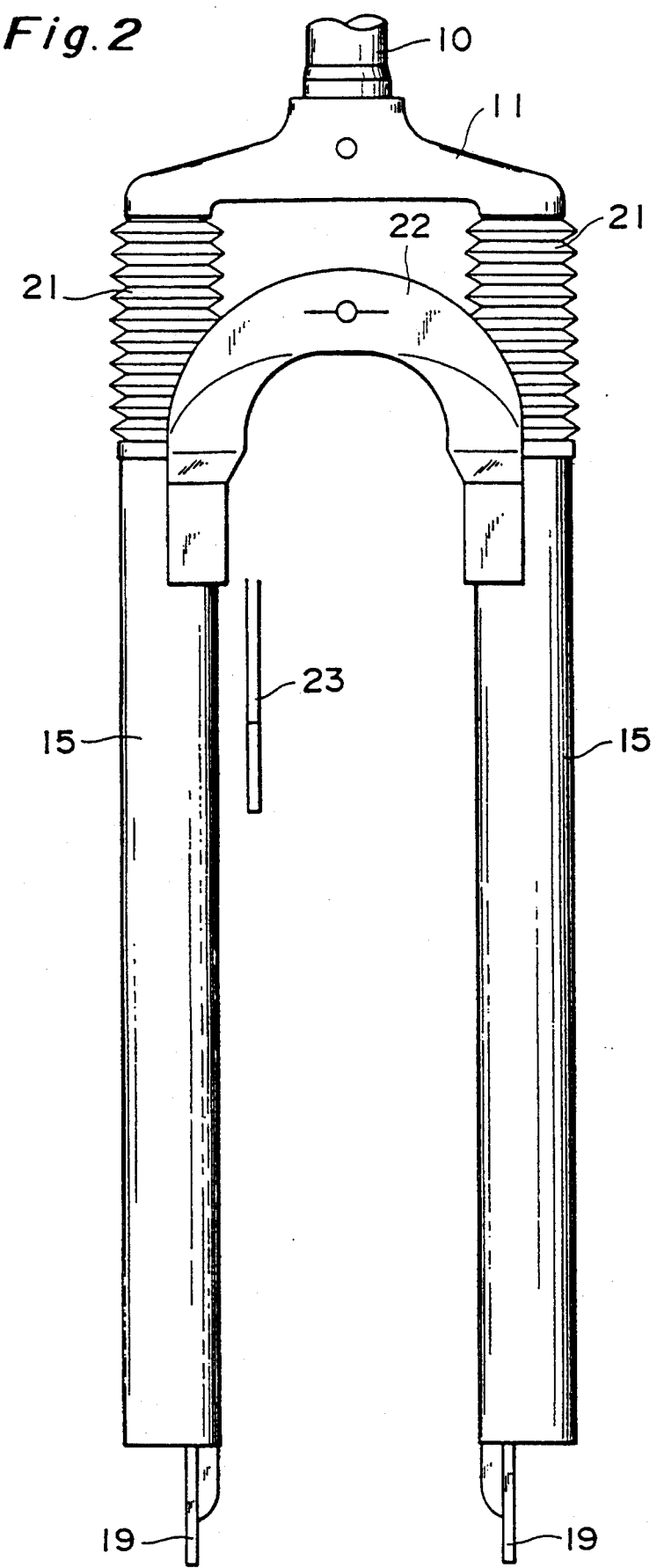
FIG. 2 is a front view of the wheel suspension type front fork of FIG. 1.
Figure 3:
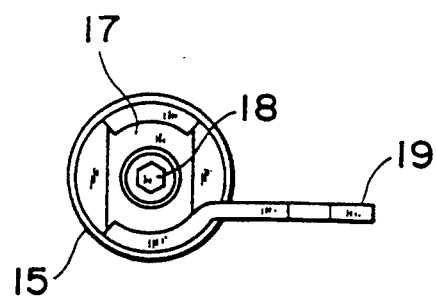
FIG. 3 is a bottom view of a sliding tube of the front fork of FIG. 1.

FIG. 1 is a sectional view of a wheel suspension type front fork according to the present invention which is applied to a front wheel of bicycle, FIG. 2 is a front view of the front fork and FIG. 3 is a bottom view of a sliding tube used in the front fork.

In FIG. 2, numeral 10 denotes a steering tube having an upper end to which a handlebar is mounted through an extension stem not shown. A lower end of the steering tube 10 is press fitted into a middle portion of a fork crown 11 and fixed thereto.

Referring now to FIG. 1, upper portions of a pair of supporting tubes 12 are fixedly fitted into both arms of the fork crown 11. An upper receiving member 13 is fitted into each lower end of the supporting tubes 12 and fixed thereto. Helical grooves 13a are formed in a peripheral surface of the upper receiving member 13 protruded below from the supporting tube 12 and one closely wound end portion of a coil spring 14 is engaged with the helical grooves 13a to thereby fixedly mount the end portion of the coil spring 14 to the upper receiving member 13.

The coil spring 14 is disposed in a lower side portion of the sliding tube 15 and a lower receiving member 16 is disposed near a lower portion of the sliding tube 15. Helical grooves 16a are formed in a peripheral surface of the lower receiving member 16 similarly and the other closely wound end portion of the coil spring 14 is engaged with the screwy grooves 16a and fixed thereto.

As shown in FIGS. 1 and 3, a U-shaped fixing member 17 is fixedly welded to an inner peripheral surface of a lower end of the sliding tube 15. A fixing bolt 18 penetrating the fixing member 17 from below thereof is engaged into a center of the lower receiving member 16 to thereby fixedly mount the lower receiving member 16 to the lower portion of the sliding tube 15. A wheel receiving portion 19 is integrally formed in the fixing member 17.

An upper half portion of the sliding tube 15 is slidably fitted onto the supporting tube 12 through a sleeve 20 having a two-division structure. The sleeve 20 is formed of polyimide resin and an inner flange portion formed at a lower end of the sleeve 20 is engaged into an annular groove formed in a peripheral surface of the upper receiving member 13.

An upper portion of the supporting tube 12 is covered with bellows 21 for protection dust. An upper end of the bellows 21 is fixed to a step of the fork crown 11 and a lower end of the bellows 21 is fixed to a peripheral surface of an upper end of the sliding tube 15.

Upper portions of both the sliding tubes 15 are coupled with each other by means of a cross member 22. In FIGS. 1 and 2, numeral 23 denotes a base for mounting a dynamo.

Operation of the front fork according to the present invention is now described.

When a shock is given to a front wheel attached to the wheel receiving portion 19 through an axle, the sliding tube 15 moves up against the resilient force of the coil spring 14 and slides through the sleeve 20 on the supporting tube 12. Accordingly, the force of shock can be absorbed by the upward movement of the sliding tube 15 and the contraction of the coil spring 14.

Thereafter, the coil spring 14 is to be extended by the force of rebound, while since both the ends of the coil spring 14 are fixedly mounted to the upper receiving member 13 and the lower receiving member 16, the force of rebound can be absorbed by the reaction to thereby return the sliding tube 15 to its original state.

Further, since the supporting tube 12 is coupled with the sliding tube 15 through the coil spring 14, the upper and lower receiving members 13 and 16 and the like, the sliding tube 15 can be prevented from slipping out from the supporting tube.

In the embodiment, the sleeve 20 may be formed of metal or the like and it is desirable that the sleeve is applied with grease to reduce the sliding friction.

Furthermore, even if both the ends of the coil spring 14 is fixedly mounted to the upper and lower receiving members 13, 16 by any measures, the effects of the present invention can be obtained.

Figure 4:
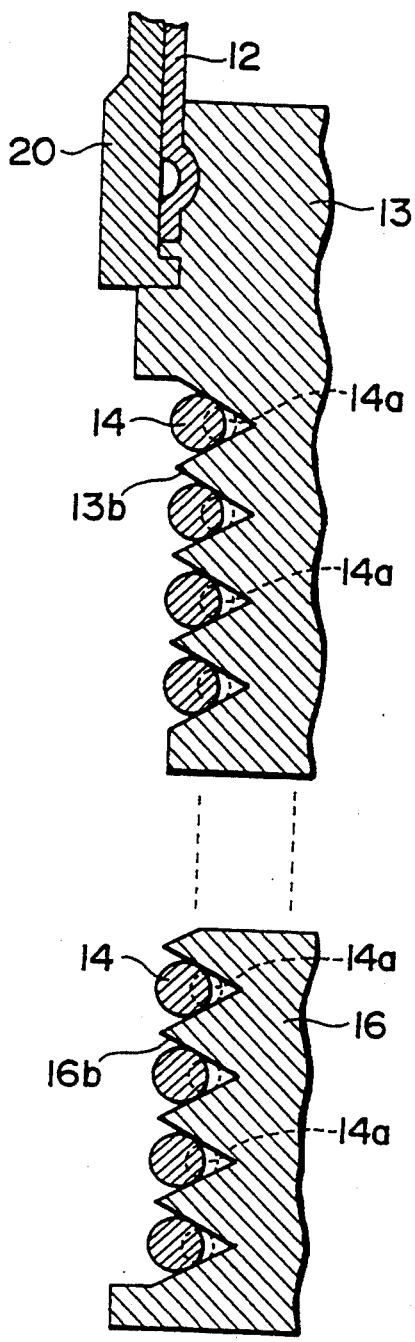
FIG. 4 is a sectional view of a portion according to another embodiment of the present invention.

FIG. 4 shows another embodiment of the present invention. In the embodiment, helical grooves 13b and 16b having a V-shape in section are formed in the upper and lower receiving members 13 and 16, respectively. Both of closely wound end portions of the coil spring 14 are engaged with the grooves 13b and 16b and fixed thereto. In this manner, by forming the helical grooves 13b and 16b into the V-shape, the coil springs 14 or 14a having a different diameter of wire can be selected at discretion even if the same receiving members 13 and 16 are used. Accordingly, since the coil spring can be selected as shock absorption means, adjustment of the absorption force can be made easily.

I claim:

1. A wheel suspension type front fork including a pair of supporting tubes fixedly mounted to a steering tube and a sliding tube slidably fitted to each of said supporting tubes, each said sliding tube having a lower end in which an axle receiver is formed, said wheel suspension type front fork comprising an upper receiving member having a V-shaped groove, said upper receiving member being fixedly mounted to said supporting tube, a coil spring disposed within said sliding tube and having one end fixedly mounted to said V-shaped groove of said upper receiving member, and a lower receiving member having a V-shaped groove, said lower receiving member being fixedly mounted to said sliding tube, and having another end of said coil spring mounted to said V-shaped groove of said lower receiving member.

2. A wheel suspension front fork according to claim 1, wherein said V-shaped grooves are formed in peripheral surfaces of said upper and lower receiving members, respectively, and to which respective ends of said coil spring are engaged.

3. A wheel suspension type front fork according to claim 1, wherein said V-shaped groove in at least one of said upper receiving member and said lower receiving member is of a helical form.

4. A wheel suspension type front fork according to claim 2, wherein said V-shaped groove in at least one of said upper receiving member and said lower receiving member is of a helical form.

5. A wheel suspension type front fork including a pair of supporting tubes and a sliding tube slidably fitted to each of said supporting tubes, comprising
   an upper receiving member fixedly mounted to each said supporting tube,
   a lower receiving member fixedly mounted to each said sliding tube,
   at least one of said upper receiving member and said lower receiving member including a V-shaped groove, and
   a coil spring mounted to said upper receiving member and said lower receiving member, said coil spring being selected from a plurality of coil springs formed from wire having different diameters which can be engaged by said V-shaped groove.

* * * * *